United States Patent
Zager et al.

(10) Patent No.: US 10,168,114 B2
(45) Date of Patent: Jan. 1, 2019

(54) INTEGRAL DRAIN ASSEMBLY FOR A HEAT EXCHANGER AND METHOD OF FORMING

(71) Applicant: HAMILTON SUNDSTRAND CORPORATION, Windsor Locks, CT (US)

(72) Inventors: Michael Zager, Windsor, CT (US); Michael Doe, Southwick, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/251,885

(22) Filed: Aug. 30, 2016

(65) Prior Publication Data
US 2018/0058779 A1    Mar. 1, 2018

(51) Int. Cl.
| F28F 17/00 | (2006.01) |
| F28D 1/047 | (2006.01) |
| F02B 29/04 | (2006.01) |
| F24H 9/16 | (2006.01) |

(52) U.S. Cl.
CPC ........ *F28F 17/005* (2013.01); *F02B 29/0468* (2013.01); *F24H 9/16* (2013.01); *F28D 1/047* (2013.01); *F28F 2265/06* (2013.01); *F28F 2265/22* (2013.01)

(58) Field of Classification Search
CPC ...... F28F 17/005; F28F 17/00; F28F 2265/06; F28F 2265/22; F28D 1/047; F02B 29/0468; F24H 9/16
See application file for complete search history.

(56) References Cited

U.S. PATENT DOCUMENTS

| 4,350,025 A | 9/1982 | Izumi |
| 5,481,886 A * | 1/1996 | Hasegawa ............... F24F 13/22 165/913 |
| 5,775,402 A | 7/1998 | Sachs |
| 8,707,722 B2 | 4/2014 | Ekman et al. |
| 9,073,150 B2 | 7/2015 | Graichen et al. |
| 9,174,387 B2 | 11/2015 | Luzenski |
| 2007/0169500 A1 | 7/2007 | Rios et al. |
| 2013/0306280 A1* | 11/2013 | Goodman ................. F28F 1/12 165/109.1 |
| 2014/0150656 A1* | 6/2014 | Vandermeulen .......... F28F 1/02 96/7 |
| 2014/0158328 A1* | 6/2014 | Persson ................... F28F 3/042 165/109.1 |

(Continued)

FOREIGN PATENT DOCUMENTS

WO    2015004591 A1    1/2015

OTHER PUBLICATIONS

Search Report regarding related EP App. No. 17185892.1; dated Feb. 6, 2018; 7 pgs.

*Primary Examiner* — Ana Vazquez
(74) *Attorney, Agent, or Firm* — Cantor Colburnc LLP

(57) ABSTRACT

An integral drain assembly for a heat exchanger includes a plurality of passage walls defining a plurality of passages, each of the passage walls having a non-linear portion. Also included is a drain wall integrally formed with at least one of the passage walls to define a drain for each of the plurality of passages, the drain wall located proximate the non-linear portion of each of the plurality of passage walls.

7 Claims, 1 Drawing Sheet

(56) References Cited

U.S. PATENT DOCUMENTS

2015/0096718 A1 4/2015 Baron
2016/0161195 A1 6/2016 Meng
2016/0195336 A1 7/2016 Veilleux, Jr.

* cited by examiner

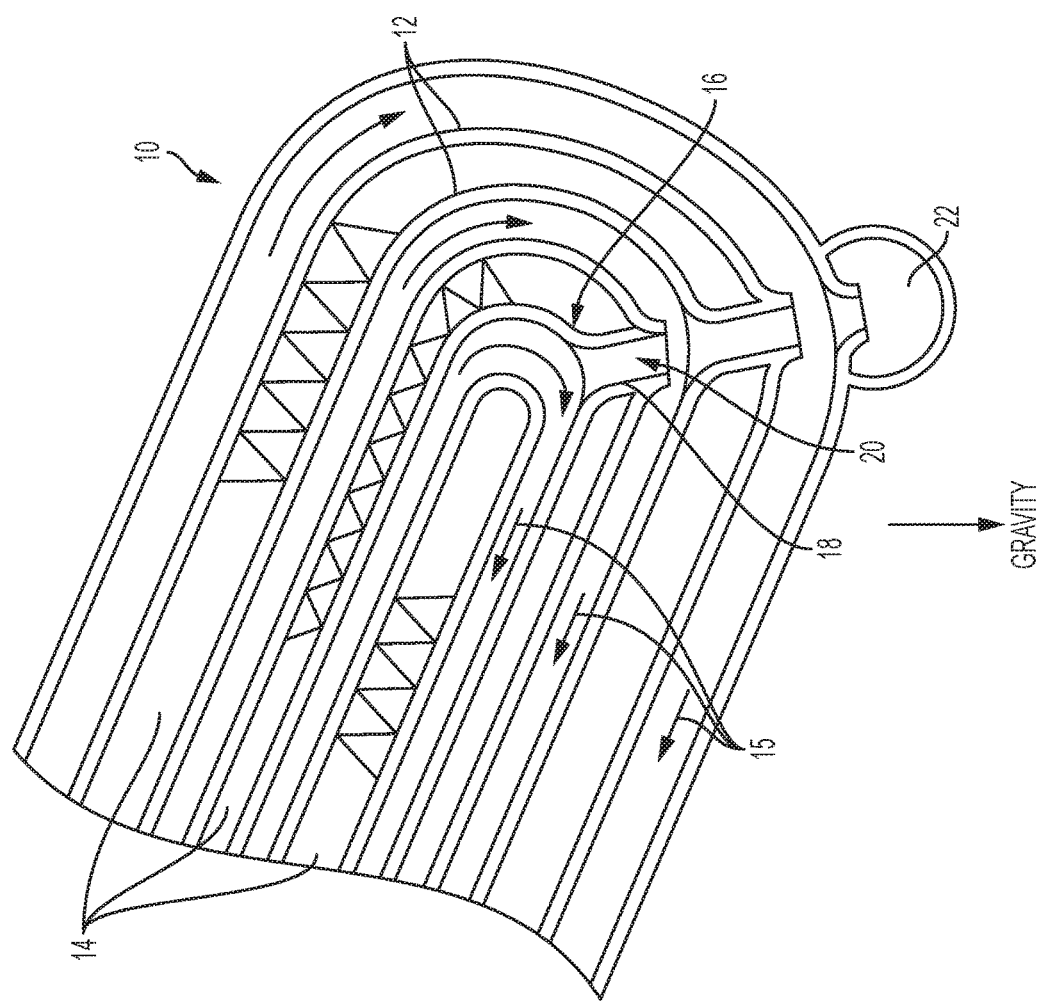

INTEGRAL DRAIN ASSEMBLY FOR A HEAT EXCHANGER AND METHOD OF FORMING

BACKGROUND

The embodiments herein relate to heat exchangers and, more particularly, to an integral drain assembly for heat exchangers, as well as a method of forming such heat exchangers.

Heat exchangers often condense water when humid air is cooled. The orientation of each heat exchanger is typically governed by installation constraints and is not always ideal for promoting drainage of the condensed water. Incomplete drainage can lead to corrosion and freezing damage, thus limiting heat exchanger life and/or failure of the heat exchanger to perform its intended function.

BRIEF DESCRIPTION

According to one embodiment, an integral drain assembly for a heat exchanger includes a plurality of passage walls defining a plurality of passages, each of the passage walls having a non-linear portion. Also included is a drain wall integrally formed with at least one of the passage walls to define a drain for each of the plurality of passages, the drain wall located proximate the non-linear portion of each of the plurality of passage walls.

According to another embodiment, a method of forming an integral drain for a heat exchanger is provided. The method includes forming a plurality of passage walls to define a plurality of passages with an additive manufacturing process, each of the passage walls having a non-linear portion. The method also includes integrally forming a drain wall with at least one of the passage walls with the additive manufacturing process to define a drain for each of the plurality of passages, the drain wall located proximate the non-linear portion of each of the plurality of passage walls.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

FIG. 1 is a cross-sectional view of a heat exchanger having an integral drain assembly.

DETAILED DESCRIPTION

Referring to FIG. 1, a cross-section of a heat exchanger is illustrate and generally referenced with numeral 10. The illustrated heat exchanger is a cross-flow heat exchanger, but it is to be appreciated that a counter-flow heat exchanger may be employed. Furthermore, it is contemplated that any application where access for drains is difficult or impossible to implement may benefit from the embodiments disclosed herein.

The heat exchanger 10 includes a plurality of passage walls 12 that define at least one, but typically a plurality of passages 14, as shown. The passages 14 are configured to route a fluid 15 therealong for heat transfer purposes. Condensation of the fluid (such as humid air) occurs within the passages 14, thereby leaving condensed liquid within the passages 14.

The plurality of passage walls 12, and therefore passages 14, may extend along any desired or advantageous path. Regardless of the path of the passages 14, a non-linear portion 16 of the path is provided. Although there may be multiple non-linear portions along the path of the passages 14, at least part of the non-linear portion 16 shown is located at a lowest point of the passage 14 when the heat exchanger 10 is in an installed position. More specifically, the lowest point of the passage 14 is positioned where gravity will ultimately draw any condensed liquid located within the passage 14.

At least one drain wall 18 is located proximate the non-linear portion 16 of each passage 14 at the lowest point of the passage. The drain wall 18 defines a drain 20 that is sized to receive condensed liquid for routing out of the passage 14. By placing the drain 20 at the lowest point of the passage (when the heat exchanger 10 is in an installed position), all of the condensed liquid in the passage 14 flows to the drain 20 due to gravitational effect, whether the liquid is upstream or downstream of the drain 20. The drain 20 is small enough to not cause a pressure differential in the passage 14 that alters desired operation of the heat exchanger 10.

As shown, a plurality of drains 20 are employed in some embodiments to fluidly couple the passages 14 and ultimately fluidly couple each drain 20 and passage 14 to a common drain 22. The common drain 22 may be a manifold or the like that routes the liquid to a desired remote location.

The heat exchanger 10 and particularly the drain(s) 20 are formed from an additive manufacturing process that allows the drain(s) 20 to be integrally formed with the heat exchanger 10 and the respective passages 14. Similarly, the common drain 22 may be integrally formed with the heat exchanger 10 by an additive manufacturing process to collect liquid from multiple drain locations, if needed. The additive manufacturing process employed to form the heat exchanger 10 includes direct metal laser sintering (DMLS). A non-metallic heat exchanger is also contemplated for some applications. In such embodiments, selective laser sintering (SLS) may be employed as the additive manufacturing process. Both processes are a form of powder bed fusion.

By integrally forming the drain(s) 20 and common drain 22 with the heat exchanger by an additive manufacturing process, the drain is able to be placed in areas that were previously difficult or impossible to access. Installations previously considered unacceptable may now be considered, thus providing additional proposed solutions for customers. Therefore, the drain is better placed and less costly to implement. Additionally, by ensuring that all condensed liquid is removed from the passages 14, the reliability and life of a condensing heat exchanger is increased due to reduced corrosion and prevention of freezing damage. The enhanced reliability and the reduction in replacement needs increases customer satisfaction.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. An integral drain assembly for a heat exchanger comprising:
    a plurality of passage walls defining a plurality of passages, each of the passage walls having a non-linear portion; and
    a respective drain wall integrally formed with each of the passage walls to define a drain for each of the plurality of passages, the drain wall located proximate the non-linear portion of each of the plurality of passage walls, the drain of each of the plurality of passages aligned with each other and located at different elevations in an operating orientation of the heat exchanger, each passage fluidly coupled by the respective drain of each passage to have fluid flow sequentially throughout the passages before reaching a common drain.

2. The integral drain assembly of claim 1, wherein the drain of each passage is disposed at a lowest point of the passage in an installed position of the heat exchanger.

3. The integral drain assembly of claim 2, wherein a condensed fluid remaining in each passage is routed to the drain due to gravity.

4. The integral drain assembly of claim 1, wherein the common drain routes drained fluid to a remote location.

5. The integral drain assembly of claim 1, wherein the heat exchanger is formed with an additive manufacturing process.

6. The integral drain assembly of claim 1, wherein the heat exchanger is a cross-flow heat exchanger.

7. The integral drain assembly of claim 1, wherein the heat exchanger is a counter-flow heat exchanger.

* * * * *